United States Patent
Chang et al.

(10) Patent No.: US 9,626,632 B2
(45) Date of Patent: Apr. 18, 2017

(54) APPARATUS, SYSTEM, AND METHOD FOR LOGICALLY PACKAGING AND DELIVERING A SERVICE OFFERING

(75) Inventors: Sandra Sheu Chang, San Jose, CA (US); Dikran S. Meliksetian, Danbury, CT (US); Peng Ye, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 2499 days.

(21) Appl. No.: 11/691,382

(22) Filed: Mar. 26, 2007

(65) Prior Publication Data

US 2008/0243629 A1 Oct. 2, 2008

(51) Int. Cl.
G06Q 30/00 (2012.01)
G06Q 10/06 (2012.01)
G06Q 30/06 (2012.01)

(52) U.S. Cl.
CPC ......... *G06Q 10/06* (2013.01); *G06Q 30/0621* (2013.01); *G06Q 30/0633* (2013.01); *G06Q 30/0641* (2013.01)

(58) Field of Classification Search
CPC .................................................. G06Q 30/621
USPC ....................................................... 705/26, 27
See application file for complete search history.

(56) References Cited

U.S. PATENT DOCUMENTS

| | | | |
|---|---|---|---|
| 6,606,744 B1 | 8/2003 | Mikurak | 717/174 |
| 6,640,252 B2 | 10/2003 | Hintermeister et al. | 709/245 |
| 6,671,818 B1 | 12/2003 | Mikurak | 714/4 |
| 6,880,002 B2 | 4/2005 | Hirschfeld et al. | 709/223 |
| 7,533,026 B2 * | 5/2009 | Greenstein | G06Q 30/02 705/1.1 |
| 2001/0047411 A1 | 11/2001 | Kurose et al. | 709/225 |
| 2002/0171678 A1 * | 11/2002 | Bandhole et al. | 345/744 |
| 2003/0195756 A1 * | 10/2003 | Greenstein | G06Q 30/02 717/101 |
| 2004/0002883 A1 | 1/2004 | Andrews et al. | 705/8 |
| 2004/0154000 A1 | 8/2004 | Kasravi et al. | 717/130 |
| 2004/0221005 A1 | 11/2004 | Albaugh et al. | 709/203 |
| 2005/0131773 A1 * | 6/2005 | Daur et al. | 705/26 |
| 2005/0163143 A1 * | 7/2005 | Kalantar | G06F 9/50 370/431 |
| 2005/0177545 A1 * | 8/2005 | Buco | G06Q 10/10 |
| 2005/0203955 A1 | 9/2005 | Ramaswamy et al. | 707/104.1 |
| 2005/0204367 A1 | 9/2005 | Minium, Jr. et al. | 719/328 |

(Continued)

OTHER PUBLICATIONS

"Digital Asset Management Using a Native XML Database Implementation," Natu, S. et al. ACM Digital Library; 2003.

(Continued)

*Primary Examiner* — Rob Pond
(74) *Attorney, Agent, or Firm* — Kunzler Law Group

(57) ABSTRACT

An apparatus, system, and method are disclosed for logically packaging and delivering a service offering. A set of service implementation artifacts, a service ordering process, and a service provisioning process are selected and configured to implement a service offering. A requirements specification for the set of service implementation artifacts is defined. Logical associations between parameters are defined such that a change of a parameter for a first component triggers a change for a parameter of a second component. Beneficially, such an apparatus, system, and method accelerates the self-service ordering and deployment of service offerings.

13 Claims, 8 Drawing Sheets

(56) References Cited

U.S. PATENT DOCUMENTS

2005/0228878 A1* 10/2005 Anstey et al. .............. 709/224
2006/0048140 A1   3/2006 Boctor et al. .............. 717/175
2006/0168098 A1   7/2006 Allard et al. .............. 709/217

OTHER PUBLICATIONS

"Reusable Software Components," Levine, T., ACM Digital Library; 1998.
Cervantes, H. et al. "Beanome: A Component Model for the OSGi Framework," Domaine Universitaire Grenoble, Cedex 9 France, Jan. 2002.
Beckerle, M. et al. "Enterprise Grid Security Requirements," Enterprise Grid Alliance Security Working Group. V 1.0, Jul. 8, 2005.

* cited by examiner

APPARATUS, SYSTEM, AND METHOD FOR LOGICALLY PACKAGING AND DELIVERING A SERVICE OFFERING

BACKGROUND OF THE INVENTION

Field of the Invention

This invention relates to service offerings and more particularly relates to customizable service offerings.

Description of the Related Art

Service offerings are in great demand in modern business. These service offerings include IT infrastructure, middleware, or business applications deployed to a variety of hardware components. Packaging these service offerings to meet the needs of a particular customer is typically a labor-intensive process involving manual assembly and configuration of various components by an expensive expert.

Configuration of the service offering also requires this low-level intervention, involving significant expense and delay. In addition, events requiring re-provisioning of the service offering, such as a failure to maintain service level agreement (SLA) requirements, can result in significant expense and delay while a technician re-assembles the service offering in an attempt to change the hardware and software resources assigned to the service offering.

Packaging and managing these offerings and making them available for ordering is a static process. As a result, ordering service offerings can be too rigid and slow to accommodate today's speedy on-demand business dynamics.

SUMMARY OF THE INVENTION

From the foregoing discussion, it should be apparent that a need exists for an apparatus, system, and method that logically packages and delivers service offerings. Beneficially, such an apparatus, system, and method would accelerate the ordering and deployment of service offerings. Furthermore, a need exists for service offerings capable of adapting to specific user needs. In particular, a need exists for a service offering that an end user can customize and tailor and which responds to customizations by dynamically adjust service offering resources without the assistance of a service offering developer.

The present invention has been developed in response to the present state of the art, and in particular, in response to the problems and needs in the art that have not yet been fully solved by currently available service offerings. Accordingly, the present invention has been developed to provide an apparatus, system, and method for logically packaging and delivering a service offering that overcome many or all of the above-discussed shortcomings in the art.

A computer program product comprising a computer readable medium having computer usable program code programmed for logically packaging software components to support delivering user-defined service offerings is provided with a plurality of modules configured to functionally execute the necessary operations of logically packaging and delivering a service offering. These operations in the described embodiments include selecting a set of service implementation artifacts configured to implement a service offering and defining a requirements specification for the set of service implementation artifacts, the requirements specification defining one or more of implementation scaling parameters and software requirement parameters.

The computer program product may also include operations for selecting a service ordering process from a set of service ordering processes configured to facilitate ordering of a service offering according to predefined service ordering procedures, selecting a service provisioning process from a set of service provisioning processes configured to provision a service offering according to a plurality of service oriented architectures, and defining at least one logical association between parameters defined for at least two components selected from the group comprising the requirements specification, the service ordering process, and the service provisioning process, the logical association configured such that a change of a parameter for a first component triggers a change for a parameter of a second component.

The computer program product, in one embodiment, further comprises operations for selecting a pricing model from a set of pricing models suitable for determining a cost of different types of service offerings, selecting a service level agreement (SLA) template from a set of service level agreement templates configured to associate various service level parameters with corresponding hardware requirements, and storing a service offering comprising the requirements specification, the pricing model, the SLA template, the service ordering process, the service provisioning process, and the at least one logical association. In another embodiment, the computer program product includes operations for selecting a service de-provisioning process from a set of service de-provisioning processes configured to de-provision a service offering according to a plurality of service oriented architectures.

The operations of the computer program product further include, in one embodiment, selecting a service monitoring process from a set of service monitoring processes configured to monitor a service offering according to a plurality of service monitoring techniques. The computer program product may also include operations for selecting a service re-provisioning process from a set of re-provisioning processes configured to re-provision a service offering according to a plurality of service oriented architectures, the re-provisioning process initiated in response to a logical association indicating that the service offering requires a change in resources to meet a service level agreement requirement.

In one embodiment, the computer program product may include operations for selecting a service reporting process from a set of service reporting processes configured to report performance of a service offering according to a plurality of service reporting techniques. Each of the service implementation artifacts in the set of service implementation artifacts may be configured to perform a service function and may comprise executable code and machine-readable metadata defining how to deploy the service implementation artifact in a service offering.

A system of the present invention is also presented to logically package and deliver a service offering. The system may be embodied by an application server, a packaging and delivery application, and a database. In particular, the system, in one embodiment, includes an application server configured to host an application.

The system may further include a packaging and delivery application hosted by the application server. The packaging and delivery application may include a service catalog module configured to present a service catalog comprising service offerings, a selection module configured to receive a selection of a service offering from a user and initiate a service ordering process, and a configuration module configured to receive a set of configuration options for the selected service offering from the user, the configuration options based on a requirements specification associated with the service offering.

The packaging and delivery application may also include a sizing module configured to size the selected service offering in response to the received set of configuration options, wherein sizing the offering comprises determining necessary hardware and software resources for the service offering based on at least one logical association between parameters defined for at least two components selected from a group comprising the requirements specification, the service ordering process, and a service provisioning process, the logical association configured such that a change of a parameter for a first component triggers a change for a parameter of a second component. A provisioning module configured to allocate service implementation artifacts and hardware resources to the service offering may also be included in the packaging and delivery application. The packaging and delivery application may also include a deployment module configured to deploy the service offering.

The system may also include a database configured to store information defining service offerings for retrieval by the packaging and delivery application. In one embodiment, the system includes a datacenter, wherein the deployment module deploys the service offering to the datacenter. In a further embodiment, the deployment module in the system deploys the service offering by delivering an automated deployment package for the service offering to the user for deployment. The selection module, in one embodiment, comprises a user interface configured to provide interaction between the user and the packaging and delivery application.

In one embodiment, the provisioning module is further configured to determine a cost for the service offering based on a pricing model associated with the service offering. The service offerings in the system, in one embodiment, comprise one or more service implementation artifacts, each artifact configured to perform a function and comprising executable code and machine-readable metadata defining how to deploy the service implementation artifact in a service offering.

In a further embodiment, the deployment module in the system is further configured to deploy the service offering in compliance with the service ordering process and such that a service level agreement (SLA) defined in an SLA template associated with the service offering is satisfied. In another embodiment, the system includes a re-provisioning module, wherein the re-provisioning module re-provisions the deployed service offering according to a plurality of service oriented architectures, the re-provisioning initiated in response to a logical association indicating that the service offering requires a change in resources to satisfy an SLA.

A method of the present invention for deploying computing infrastructure is also presented for integrating computer-readable code into a computing system, wherein the code in combination with the computing system is capable of logically packaging and delivering a service offering. The method in the disclosed embodiments substantially includes the steps necessary to carry out the functions presented above with respect to the operation of the described apparatus and system.

In one embodiment, the method includes presenting a service catalog comprising service offerings, the service offerings each comprising one or more service implementation artifacts, the one or more service implementation artifacts configured to perform a service function, the service implementation artifacts comprising executable code and machine readable metadata defining how to deploy the service implementation artifact in a service offering. The method also may include receiving a selection of a service offering from a user and initiating a service ordering process.

In a further embodiment, the method includes receiving a set of configuration options for the selected service offering from a user, the configuration options based on a requirements specification associated with the service offering. The method may also include sizing the selected service offering in response to the received set of configuration options, wherein sizing the offering comprises determining necessary hardware and software resources for the service offering based on at least one logical association between parameters defined for at least two components selected from a group comprising the requirements specification, the service ordering process, and a service provisioning process, the logical association configured such that a change of a parameter for a first component triggers a change for a parameter of a second component.

In one embodiment, the method includes provisioning the service offering to allocate service implementation artifacts and hardware resources to the service offering. The method may further include deploying the service offering in one embodiment. In a further embodiment, the method may include monitoring the service offering.

In an alternate embodiment, provisioning in the method includes operations to perform provisioning automatically according to a plurality of service oriented architectures. The method may further include requesting approval from a user for an order created from a sized service offering. In another embodiment, the method includes confirming the order in response to an approval from the user for the order. In yet another embodiment, the method includes re-provisioning the deployed service offering according to a plurality of service oriented architectures, the re-provisioning initiated in response to a logical association indicating that the service offering requires a change in resources to meet a service level agreement requirement.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
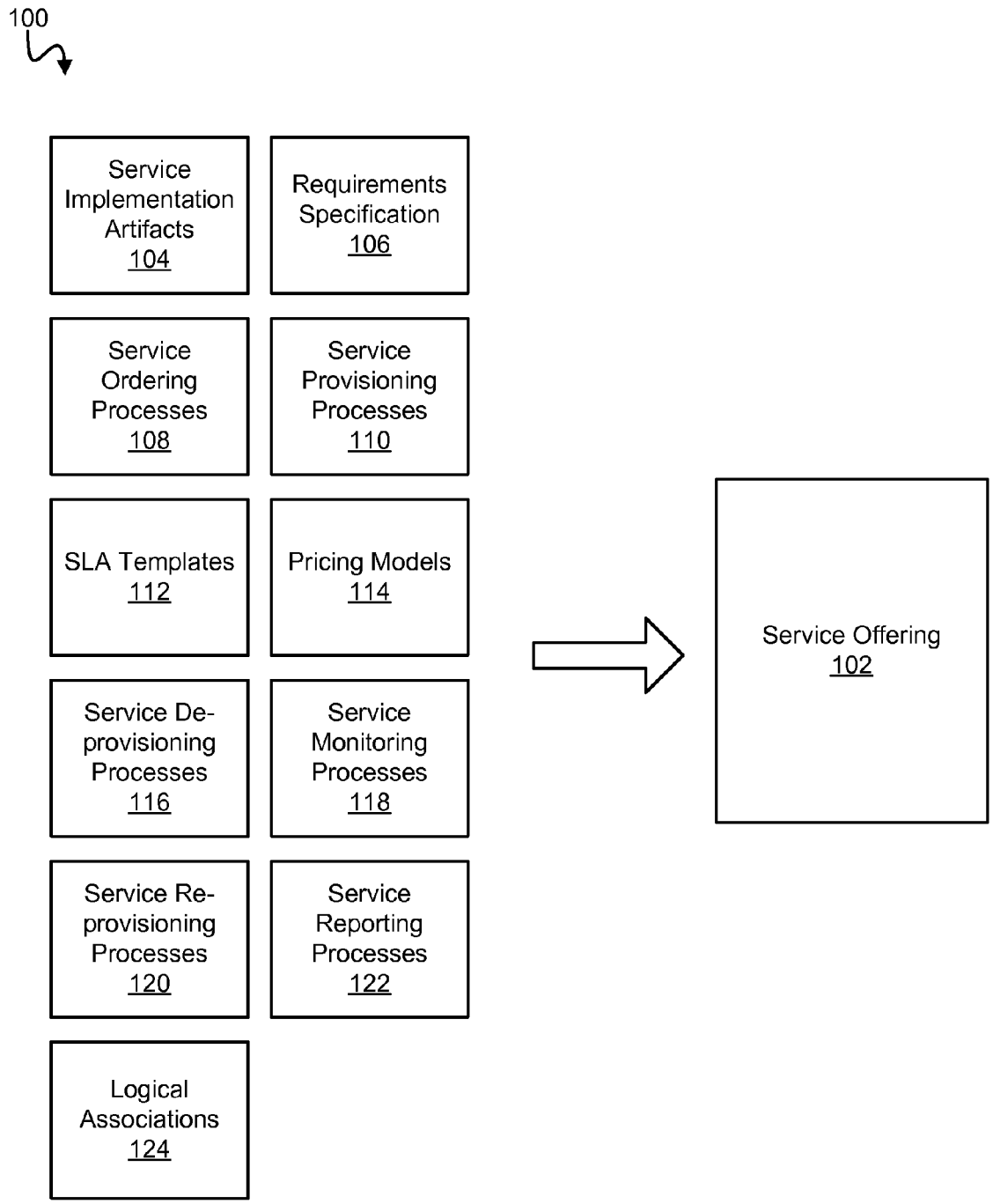
FIG. 1 is a schematic block diagram illustrating one embodiment of components that may be used to assemble a logically packaged service offering in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of causing execution of a program of machine-readable instructions on a digital processing apparatus. A computer readable storage medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of components 100 that may be used to assemble a logically packaged service offering 102. The components 100, in one embodiment, include a set of service implementation artifacts 104, a requirements specification 106, a set of service ordering processes 108, a set of service provisioning processes 110, a set of service level agreement (SLA) templates 112, a set of pricing models 114, a set of service de-provisioning processes 116, a set of service monitoring processes 118, a set of service re-provisioning processes 120, a set of service reporting processes 122, and one or more logical associations 124. A combination of the components 100 may be assembled to form a service offering 102. The components 100 in the service offering 102 may be linked by one or more logical associations 124 such that changes to one component 100 are capable of causing a change in another component.

The service offering 102, in one embodiment, comprises a collection of components 100 configured to perform a service which can be ordered by a user. The service offering 102 may include characteristics such as features, options, limitations, requirements, SLA criteria, and costs of the service offering 102. In certain embodiments, several service offerings with differing characteristics may be collected in a service catalog. The service offering 102 may indicate required options for the service offering 102. In addition, the service offering 102 may indicate optional options for the service offering 102.

For example, a service offering 102 may implement a product launch website. In this example, the service offering 102 may include components 100 to provide press releases, a products database, product ordering, SLA requirements, and website customization. The service offering 102 may include performance characteristics of the product launch website, such as response time, page views per minute, and the like. In this example, the service offering 102 may provide configurable performance level options. One of ordinary skill in the art will recognize various other service offerings 102 that may be offered by the invention.

In one embodiment, the set of service implementation artifacts 104 includes one or more service implementation artifacts. Each service implementation artifact is executable code or scripts capable of performing a service function. Each service implementation artifact may also include machine readable metadata defining how the service implementation artifact may be deployed in a service offering 102. The service implementation artifact may include parameters that relate to other service implementation artifacts, or to other components 100.

For example, a service implementation artifact in the set of service implementation artifacts 104 may be a backend database access routine configured to access a database. In this example, the service implementation artifact may include metadata detailing performance characteristics of the routine. The service implementation artifact may also include parameters used by the routine, such as connection details, passwords, and the like. One of ordinary skill in the art will recognize various other service implementation artifacts that may be included in the set of service implementation artifacts 104.

A service implementation artifact may be included in a service offering 102. For example, a service implementation artifact configured to access a backend database may be included in a service offering 102 designed to provide a product launch website. The service implementation artifact may interact with other components 100 in the service offering 102 to perform the functions of the service offering 102.

The requirements specification 106, in one embodiment, defines the requirements of the service offering 102. The requirements specification 106 may define implementation scaling parameters indicating the resources required to deploy the service offering 102 under certain configurations. In addition, the requirements specification 106 may define software requirement parameters for the service offering 102. Examples of parameters and specifications defined by the requirements specification 106 include a service description, a specification owner, a uniform resource locator (URL) of an ordering user, a key that identifies a create-order process workflow, a key that identifies a service provisioning process workflow, a key that identifies a service de-provisioning process workflow, keys that identify all possible pricing models, keys that identify all possible SLA templates, keys that identify all possible monitoring types, keys that identify all possible reporting types, and the like.

The requirements specification 106, in one embodiment, provides a boundary on what are required options and what are optional options supported for a particular service offering 102. Different service offerings 102 then can be created using this requirements specification 106 by specifying only the desired selectable service implementation artifacts 104 and inheriting all the required service implementation artifacts.

For example, a requirements specification 106 may be created for providing a website. The requirements specification 106 may include several possible pricing models, SLA templates, a service provisioning process workflow, and several reporting types. Some elements of the requirements specification 106 may be required, while some may be optional. Using this requirements specification, several service offerings 102 for providing a website can be created by selecting among the optional elements and retaining the required elements. One of ordinary skill in the art will recognize various other requirements specifications 106 that may be included in the service offering 102.

The set of service ordering processes 108, in one embodiment, includes one or more service ordering processes. Each service ordering process defines a process for ordering a service offering 102. In one embodiment, a service ordering process is predefined to meet the needs of a customer. In another embodiment, a service ordering process is predefined to meet the needs of an administrator. The set of service ordering processes 108 may include several predefined service ordering processes. A service ordering process may be incorporated into a service offering 102 to define how the service offering 102 may be ordered.

One example of a service ordering process used by a service offering 102 to create a website is a process that includes various approval requirements. The service ordering process may include configurable options for approval requirements and different outcomes resulting from different parameters and options. For example, the service ordering process may require no approval if the cost of the service offering 102 is below $5,000, one layer of approval if the cost is $5,000 or more, and two layers of approval if the cost is $15,000 or more. In another example, the cost values that trigger approval conditions may be configurable options. One of ordinary skill in the art will recognize various other service ordering processes that may be included in the set of service ordering processes 108.

In one embodiment, the set of service provisioning processes 110 includes one or more service provisioning processes. A service provisioning process defines a process for granting accesses rights to the service offering 102 and appropriating hardware and service resources for the service offering 102. In certain embodiments, a service provisioning process can be compared to a software installation program for a PC. A service provisioning process may be incorporated into a service offering 102 to define the provisioning requirements of the service offering 102. In one embodiment, changes to other elements of the service offering 102 result in changes to the service provisioning process. The service provisioning process may provision a plurality of service oriented architectures, such as client/server, three layer, clustered servers, or the like.

A service provisioning process may receive information from a requirements specification 106 indicating implementation scaling parameters which impact the service provisioning process. The service provisioning process may also receive configuration options and other information related to service provisioning. The information received may be used by the service provisioning process to generate a provisioning process that meets the needs of the other components of the service offering 102.

For example, a service offering 102 designed to provide a product launch website may provide options that impact the number of users allowed for the website. A service provisioning process may respond to an option selection that indicates that one thousand users are allowed by allocating hardware and software resources (or a services architecture) capable of managing at least one thousand users. One of ordinary skill in the art will recognize various other service provisioning processes that may be included in the set of service provisioning processes 110.

The set of SLA templates 112, in one embodiment, comprises one or more SLA templates, each SLA template indicating a set of service level parameters. The service level parameters may be associated with hardware requirements corresponding to the service level parameters. In one embodiment, the service level parameters in an SLA template may include configurable options, such that a service level may be set to a varying target value.

For example, a service offering 102 for a product launch website may include an SLA template that includes a service level parameter indicating a minimum average response time for the website. In one embodiment, the minimum average response time parameter may be set by a user ordering the service offering 102. The service level parameter may be associated through a logical association 124 (described in more detail below) with a service provisioning process. For example, a minimum response time of five seconds in the SLA template may result in the allocation of two servers in the service provisioning process, while a minimum response time of two seconds may result in the allocation of three servers in the service provisioning process. One of ordinary skill in the art will recognize various other SLA templates that may be included in the set of SLA templates 112.

In one embodiment, the set of pricing models 114 comprises one or more pricing models, each pricing model defining an algorithm for determining the price of to be charged for a service offering 102. The configuration of the various components 100 of the service offering 102 may impact the price of the service offering 102 determined by a pricing model.

For example, the pricing model may be use-based, such that a service offering 102 configured to require two servers would have a higher price than a service offering 102 configured to require one server. In another example, the pricing model may be a flat fee, such that a service offering 102 may have a set price regardless of the configuration selected. In this example, the options available in the service offering 102 may be limited such that the hardware and software resources required by the service offering 102 do not exceed preset limits. One of ordinary skill in the art will recognize various other pricing models that may be included in the set of pricing models 114.

The set of service de-provisioning processes 116, in one embodiment, comprises one or more service de-provisioning processes, each service de-provisioning process defining a process for removing access rights to a service offering 102 and de-allocating hardware and service resources for the service offering 102. The service de-provisioning process may provision a plurality of service oriented architectures, such as client/server, three layer, clustered servers, or the like.

A service de-provisioning process may be triggered by another component 100 of a service offering 102. For example, a service offering 102 providing a product launch website may include a configurable option indicating a date for the termination of the product launch. The service de-provisioning process may be initiated on that date, eliminating access to the product launch website and releasing the resources used by the website. One of ordinary skill in the art will recognize various other service de-provisioning processes that may be included in the set of service de-provisioning processes 116.

In one embodiment, the set of service monitoring processes 118 comprises one or more service monitoring processes, each service monitoring process defining a process for monitoring one or more aspects of a service offering 102. A service monitoring process may monitor a service offering 102 in accordance with any of a plurality of service monitoring techniques.

An example of a service monitoring process is quality of service (QoS) monitoring. A service offering 102 for a products launch website may include SLA requirements from an SLA template requiring an average response time of five seconds or less for the website. A service monitoring process may monitor the QoS of the service offering 102 by measuring the average response time of the products launch website. One of ordinary skill in the art will recognize various other service monitoring processes that may be included in the set of service monitoring processes 118.

The set of service re-provisioning processes 120, in one embodiment, comprises one or more service re-provisioning processes, each service re-provisioning process defining a process for adjusting accesses rights to the service offering 102 and hardware and service resources for the service offering 102. A service re-provisioning process may be incorporated into a service offering 102 to change the rights, hardware resources, or software resources allocated to the service offering 102. In one embodiment, the service re-provisioning process may be triggered by another component 100 in the service offering 102.

In one embodiment, a service re-provisioning process operates according to a plurality of service oriented architectures, such as client/server, three layer, clustered servers, or the like. The service re-provisioning process may be triggered in response to a logical association 124 (described in more detail below) indicating that an SLA requirement is not being met. A determination that an SLA requirement is not being met may indicate that the service offering 102 requires a change in provisioning to meet the SLA requirement.

For example, a service offering 102 may provide a product launch website. The service offering 102 may include an SLA template requiring a response time of five seconds or less for the website. A service monitoring process may monitor the website created by the service offering 102 to determine compliance with the SLA. If the service monitoring process reports that the average response time is greater than five seconds, a service re-provisioning process may be triggered to re-provision the service offering 102. The re-provisioning process in this example may allocate an additional server and network bandwidth to improve the response time of the website. One of ordinary skill in the art will recognize various other service re-provisioning processes that may be included in the set of service re-provisioning processes 120.

In one embodiment, the set of service reporting processes 122 comprises one or more service reporting processes. Each service reporting process may define a process for reporting a performance characteristic of the service offering 102. The service reporting process may operate according to a plurality of service reporting techniques.

For example, a service offering 102 providing a product launch website may include a service reporting process that reports performance data monitored by a service monitoring process. The service monitoring process may monitor a performance characteristic mandated by an SLA requirement. The service reporting process may convey the monitored performance data to another element of the service offering 102, such as a service re-provisioning process. One of ordinary skill in the art will recognize various other service reporting processes that may be included in the set of service reporting processes 122.

The components 100 of a service offering 102 may be associated by logical associations 124. The logical associations 124 define relationships between one or more parameters in one or more components 100 of a service offering 102. A change to a parameter in a component 100 may require a change in another parameter in a component 100. A logical association 124 between parameters defines how a parameter may change in response to a change in an associated parameter. Logical associations 124 allow for a dynamic adjustment in a service offering 102 to meet the needs of a customization of a user ordering the service offering 102.

For example, a service offering 102 for a product launch website may include an SLA template and a service provisioning process. The SLA template may include a configurable parameter indicating the required response time of the website. The service provisioning process may include a parameter indicating the number of servers to be provisioned for the service offering 102. A logical association 124 between the required response time parameter in the SLA template and the number of servers parameter in the service provisioning process may operate such that a decrease in the required response time triggers an increase in the number of servers. One of ordinary skill in the art will recognize various other logical associations 124 that may be created between parameters of components 100 of the service offering 102.

Figure 2:
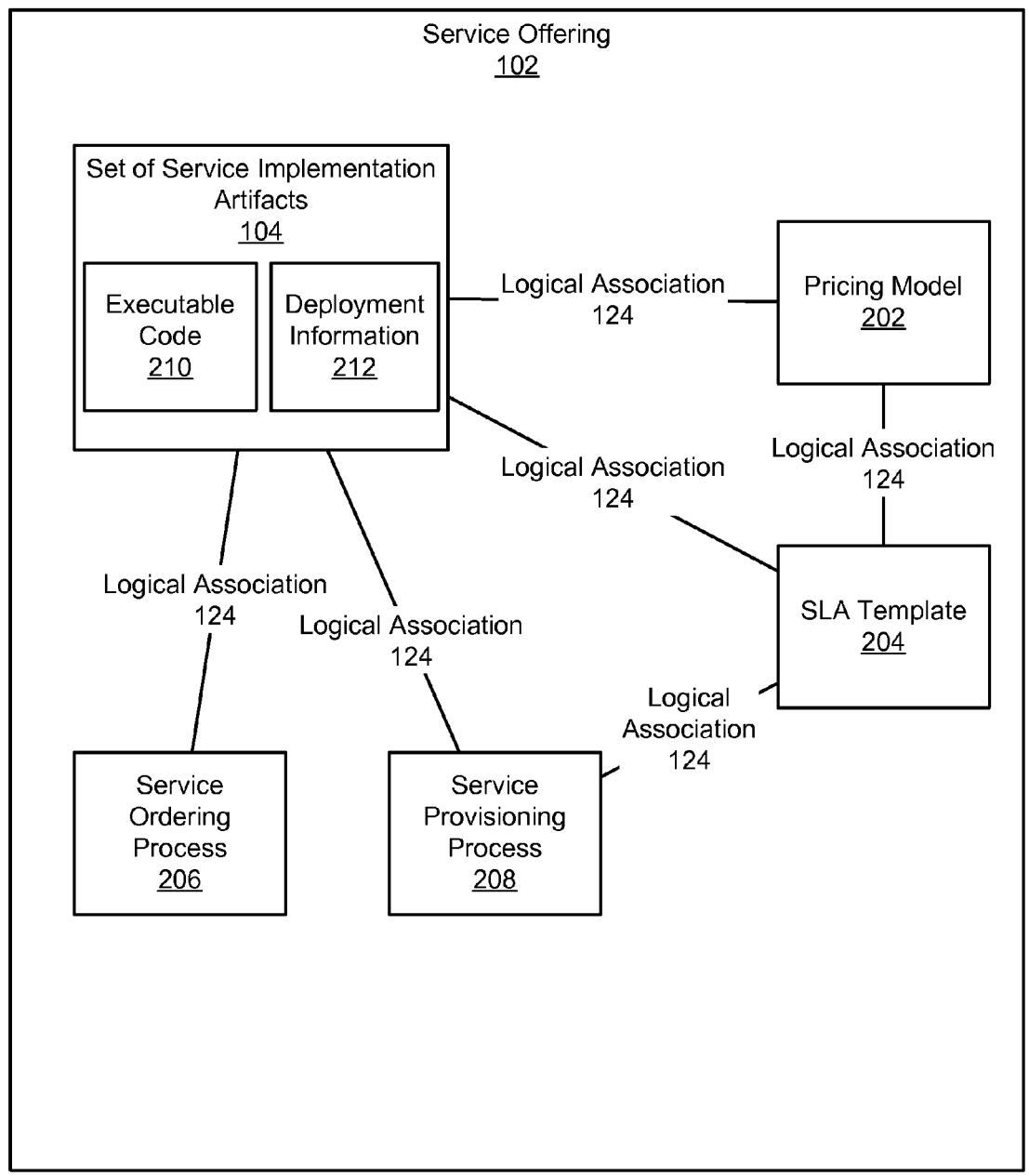
FIG. 2 is a schematic block diagram illustrating one embodiment of a service offering according to the present invention.

FIG. 2 illustrates one embodiment of a service offering 102 according to the present invention. The service offering 102 may include a set of service implementation artifacts 104, a pricing model 202, an SLA template 204, a service ordering process 206, a service provisioning process 208, and one or more logical associations 124. The service offering 102, the set of service implementation artifacts 104, and the logical associations 124 are preferably configured in a similar manner to like numbered elements discussed in reference to FIG. 1. The service offering 102 comprises a collection of components configured to perform a service which can be ordered by a user.

The set of service implementation artifacts 104, in one embodiment, comprises one or more service implementation artifacts. Each service implementation artifact comprises executable code or scripts 210 and deployment information 212. A service implementation artifact performs a service function. In one embodiment, each service implementation artifact is a reusable and parameterized.

The executable code 210 in a service implementation artifact comprises instructions capable of execution on a computing device. Any programming language may be used for the executable code 210. The executable code 210 may be source code, compiled code, machine code, interpreted code, a script, or the like. Examples of executable code 210 include C+ source code, a PHP script, an executable binary, and the like.

The deployment information 212 in a service implementation artifact comprises machine readable metadata defining how the service implementation artifact may be deployed in a service offering 102. The deployment information 212 may be stored with the service implementation artifact, or associated with the service implementation artifact in an external data store, such as a database. The deployment information 212 may include a description of required and/or optional inputs and outputs of the service implementation artifact. The deployment information 212 may also include metadata describing parameters for the service implementation artifact.

For example, a service implementation artifact may provide authentication for a user attempting to access a service offering 102. The service implementation artifact may include executable code 210 in binary form for performing authentication. Deployment information 212 for the service implementation artifact may be stored in an external database, including the types of inputs required to perform the function and the type of output of the service implementation artifact indicating success or failure of the authentication. One of ordinary skill in the art will recognize various other types of deployment information that may be included in a service implementation artifact.

The pricing model 202, in one embodiment, may be selected from a set of pricing models 114 as described in relation to FIG. 1. The pricing model 202 defines a model for determining the price of the service offering 102. One or more other components in the service offering 102 may be linked to the pricing model through one or more logical associations 124. In one embodiment, the pricing model may determine a price for the offering based on logical associations 124 to user selectable configuration options for the service offering 102.

The SLA template 204, in one embodiment, may be selected from a set of SLA templates 112 as described in relation to FIG. 1. The SLA template defines a set of service level parameters. The service level parameters may be associated with hardware requirements corresponding to the service level parameters. In one embodiment, the service level parameters in an SLA template 204 may include configurable options, such that a service level may be set to a varying target value.

The service offering 102 may include logical associations 124 between service level parameters in the SLA template 204 and other components in the service offering 102. Changes in one parameter may result in a change to an associated parameter. For example, average response time may be a service level parameter that may be modified. A logical association 124 between the average response time parameter and a pricing parameter in the pricing model 202 may cause a decreased response time to result in an increased price.

Another example is a logical association 124 between parameters of the SLA template 204 and one or more parameters of one or more service implementation artifacts in the set of service implementation artifacts 104. The SLA template 204 may include an average response time parameter as described above. If the average response time parameter is selected, a logical association 124 may be triggered between the average response time parameter and a service implantation artifact including deployment information 212 indicating that the artifact is capable of relaying response time information. One of ordinary skill in the art will recognize various other types of logical association 124 that may be included between elements of an SLA template and other elements in a service offering 102.

The service provisioning process 208, in one embodiment, may be selected from a set of service provisioning processes 110 as described in relation to FIG. 1. The service provisioning process 208 defines a process for granting accesses rights to the service offering 102 and appropriating hardware and service resources for the service offering 102.

The service provisioning process 208 may include parameters with logical associations 124 to other elements of the service offering 102. For example, a logical association 124 between a parameter of the service provisioning process 208 and a parameter of the SLA template 204 may define a relationship between a required response time of the service offering 102 and the number of servers required for the service offering 102. Another example is a logical association between a parameter of the service provisioning process 208 and a parameter of the pricing model 202 indicating a relationship between the number of servers used by the service offering 102 and the price of the service offering 102.

In one embodiment, the service ordering process 206 may be selected from a set of service ordering processes 108 as described in relation to FIG. 1. The service ordering process 206 defines a process for ordering a service offering 102.

The service ordering process 206 may include parameters with logical associations 124 to other elements of the service offering 102. For example, a logical association 124 between a parameter of the service ordering process 206 and a parameter of a service implementation artifact may indicate the service implementation artifact to be used if selected options trigger approval requirements in the service ordering process 206.

Figure 3:
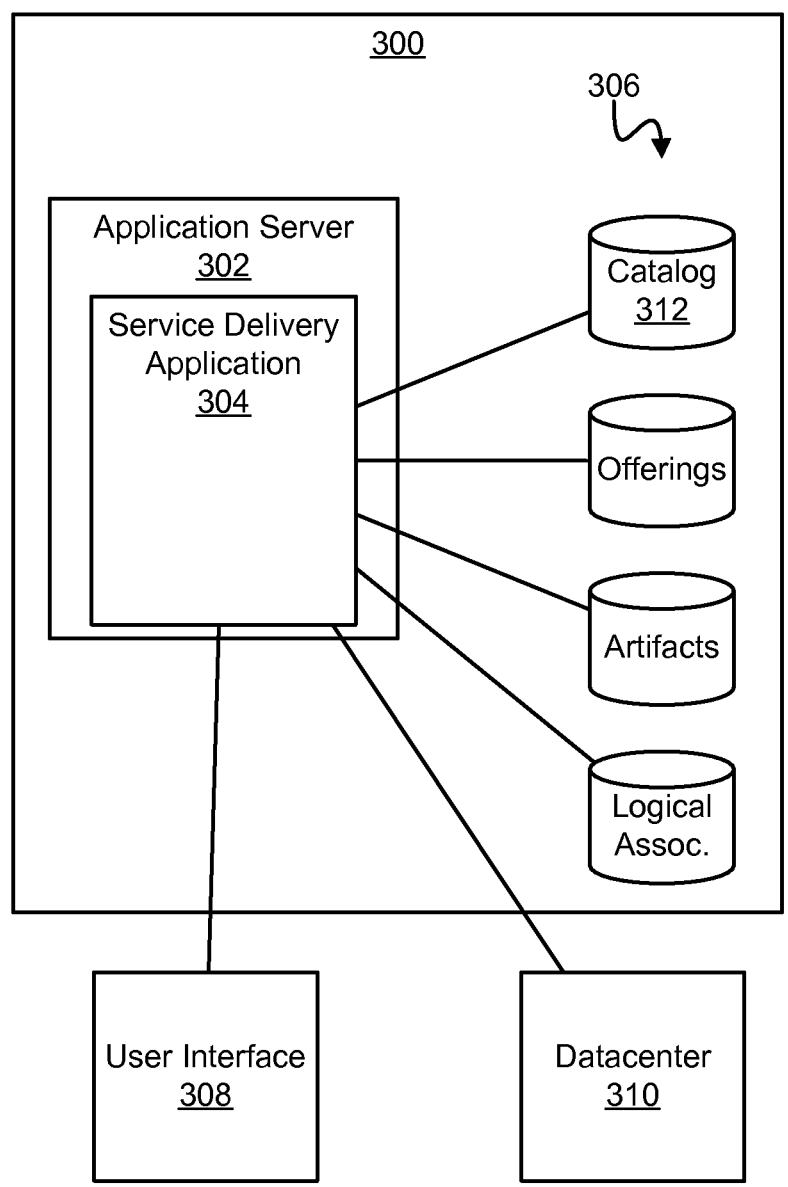
FIG. 3 is a schematic block diagram illustrating one embodiment of a system for delivering service offerings in accordance with the present invention.

FIG. 3 illustrates one embodiment of a system 300 for delivering service offerings. The system may include an application server 302, a service delivery application 304, and one or more databases 306. The system 300 for delivering service offerings presents a catalog 312 of service offerings to a user for configuration and delivery.

The application server 302, in one embodiment, is a computing system configured to host a software application. The application server 302 may include hardware and software including one or more central processing units, persistent storage, random access memory, an operating system, and the like. The application server 302 may be any computing system capable of hosting a software application, including a WebSphere™ process server, a Linux server, a Windows™ server, or the like.

The service delivery application 304 is an application configured to deliver service offerings 102. In one embodiment, the service delivery application 304 is hosted by the application server 302. The service delivery application 304 may access one or more databases 306 in the process of delivering a service offering 102.

The service delivery application 304 presents service offerings 102 and configuration options to a user. In one embodiment, the service delivery application interacts with a user interface 308 to allow a user to access the service delivery application. In one embodiment, the user interface 308 may comprise a web browser. In another embodiment, the user interface 308 may access the service delivery application 304 over the internet.

In one embodiment, the service delivery application 304 may further perform service packaging functions, as described in relation to FIGS. 1 and 2. In this embodiment, the service delivery application 304 is accessed through the user interface 308 by an administrator. The service delivery application 304 presents the administrator with options for creating and modifying service offerings 102. The service delivery application 304 may store the service offerings 102 defined by the administrator for later delivery to a user. In one embodiment, the service delivery application 304 may store service offerings 102 in a database 306.

The one or more databases 306 comprise storage media configured to allow for retrieval of service offerings 102 and components of service offerings 102 by the service delivery application 304. The components of service offerings 102 stored in one or more databases may include a service offering catalog 312, service offerings 102, service implementation artifacts 104, logical associations 124, and other components 100 described in relation to FIGS. 1 and 2, and the like. In one embodiment, the service offerings 102 and components of service offerings are stored in a single database 306. In an alternate embodiment, multiple databases 306 are used to store service offerings 102 and components of service offerings.

The service delivery application 304, in one embodiment, delivers a configured service offering 102 to a datacenter 310 for deployment. The service delivery application 304 may provision (deploy) the service offering 102 in the datacenter. In an alternate embodiment, the service offering 102 is delivered to the user as an automated deployment package. In this embodiment, the user may then deploy the automated deployment package to a server.

Figure 4:
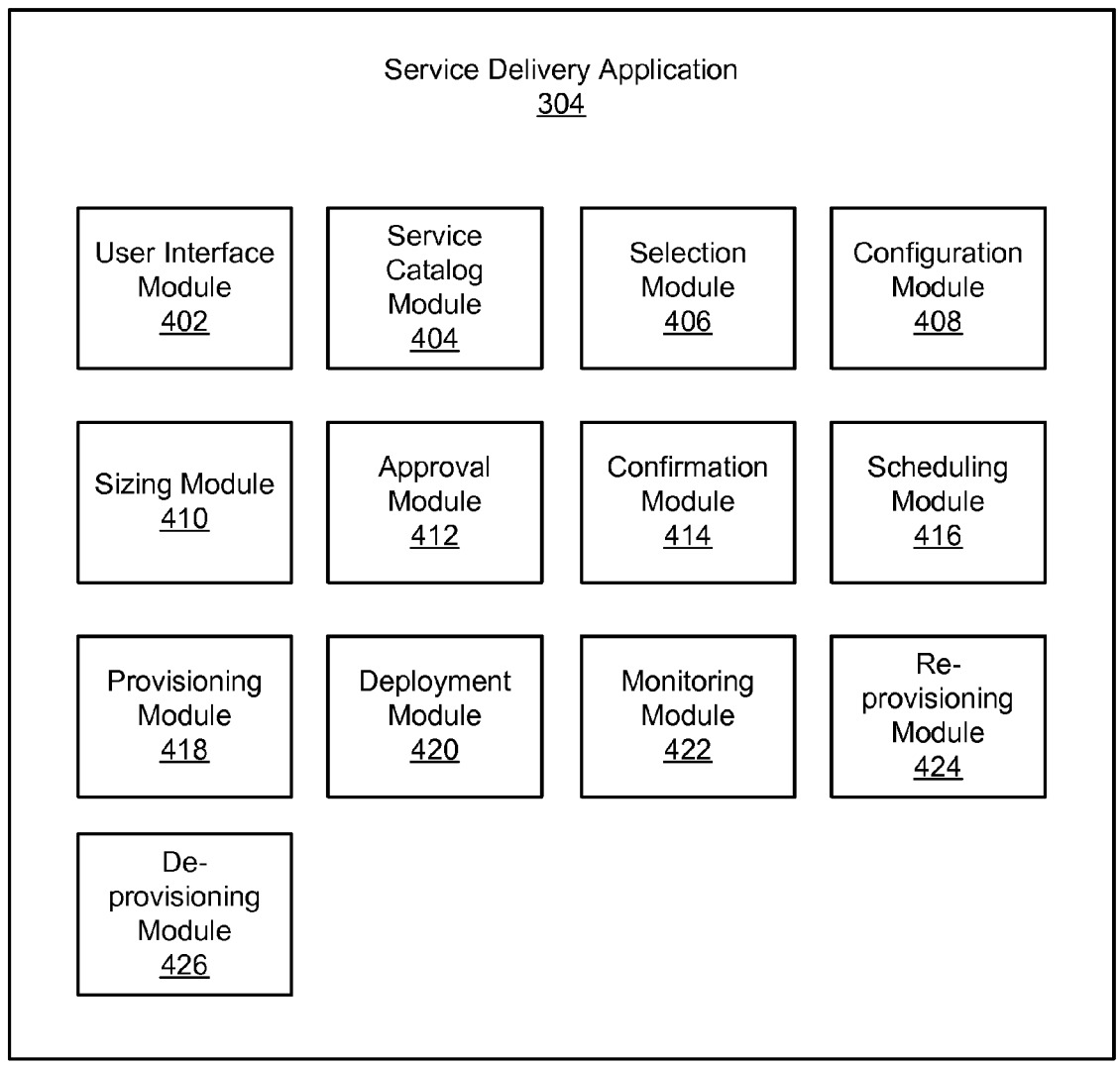
FIG. 4 is a schematic block diagram illustrating one embodiment of a service delivery application according to the present invention.

FIG. 4 illustrates one embodiment of a service delivery application 304. The service delivery application 304 may include a user interface module 402, a service catalog module 404, a selection module 406, a configuration module 408, a sizing module 410, an approval module 412, a confirmation module 414, a scheduling module 416, a provisioning module 418, a deployment module 420, a monitoring module 422, a re-provisioning module 424, and a de-provisioning module 426. The service delivery application 304 configures and delivers a service offering 102 for deployment.

The user interface module 402, in one embodiment, provides access to the service delivery application 304. The user interface module 402 may be a web browser interface configured for access via the internet. In an alternate embodiment, the user interface module 402 may comprise a graphical user interface built in to the service delivery application. In yet another embodiment, the user interface module 402 may be a command line interface.

In one embodiment, the service catalog module 404 presents a service catalog. The service catalog module 404 may present the service catalog through the user interface module 402. The service catalog may comprise one or more service offerings 102 configured to provide a service as described in relation to FIGS. 1 and 2. The service catalog module 404 may provide a description of each of the one or more service offerings 102, the description including the capabilities, requirements, and costs of each of the one or more service offerings 102. In one embodiment, the service catalog module 402 may organize the one or more service offerings 102 according to characteristics of each of the one or more service offerings 102.

For example, a service catalog module 404 may present a collection of service offerings 102 organized by type of service offering. The service catalog module 404 may have a category for service offerings 102 that provide websites. The service catalog module 404 may further optionally sort the service offerings 102 by other criteria, such as price, capability, and the like. One of ordinary skill in the art will recognize various other embodiments of a service catalog module 404.

The selection module 406, in one embodiment, receives a selection of a service offering 102 from a user. The user may access the service catalog module 404 through the user interface module 402 and select a service offering 102. The selection module 406 may initiate a service ordering process 206 as describe in relation to FIG. 2 in response to a selection. The service ordering process 206 defines the steps required to complete the order of the service offering 102.

For example, a user may browse a service catalog and select a particular service offering 102 to provide a product launch website from the service catalog 312. The selection module 406 receives this selection and triggers a service ordering process 206 associated with the service offering 102. The user may then complete the steps of ordering the service offering 102 as defined in the service ordering process 206.

In one embodiment, the configuration module 408 receives a set of configuration options from a user. The set of configuration options controls aspects of the service offering 102. A requirements specification 106 associated with the service offering 102 may define the set of configuration options. The user may access the configuration module 408 through the user interface module 402. The set of configuration options may include mutually exclusive options, options that allow the selection a group of options, ranges, discrete numbers, and the like.

For example, the requirements specification 106 for a service offering 102 to provide a products launch website may allow a user to select among configuration options in a configuration module 408. The options may include a mutually exclusive "yes/no" option allowing a user to select whether the website includes a mailing list, a discrete number option to determine the number of allowed registered users, and a range option to define the required response time of the website. One of ordinary skill in the art will recognize various other types of configuration options that may be included in a service offering 102.

The sizing module 410, in one embodiment, sizes the service offering 102 in response to the configuration options selected for the service offering 102. Sizing the service offering 102 comprises determining the necessary resources required to deploy the service offering 102. The resources involved in sizing include hardware resources, such as computers, connections, servers, and the like, and software resources, such as executable code, routines, modules, packages, and the like. Sizing the service offering 102 may result in a requirement for a first set of resources for one set of configuration options, and a second set of resources for a different set of configuration options.

The sizing module 410 may determine the resources required for the service offering 102 in response to at least one logical association 124 between parameters of components of the service offering 102 as described in relation to FIGS. 1 and 2. The at least one logical association 124 may result in a change to a parameter in a component in response to a change to a parameter in another component. The sizing module 410 may also generate a price for the service offering 102 upon determining the resources required for the service offering 102 as configured.

For example, a service offering 102 for a product launch website may have a configuration option for desired average response time. The sizing module 410 may determine that one server is required if the desired average response time is configured to be greater than five seconds. In the same example, the sizing module 410 may determine that two servers are required if the desired average response time is less than five seconds. The sizing module 410 may generate a price for the service offering 102 as configured. One of ordinary skill in the art will recognize various other types of sizing that may be performed on a service offering 102.

The approval module 412, in one embodiment, requests approval for the service offering 102. A requirements specification 106 may require approval from a user, an administrator, or a third party before allowing deployment of an associated service offering 102. In one embodiment, the requirements specification 106 may require approval upon meeting certain threshold requirements. The approval module 412 requests approval through a user interface 402, e-mail, fax, contract, or the like.

For example, a service offering 102 may include a requirements specification 106 that requires approval if the configured service offering 102 has a price above $5000. An approval module 412 may generate a request for approval in response to a configuration by a user that causes the sizing module 410 to determine a price of over $5000. The requirements specification 106 may indicate that the request for approval should be directed to a person responsible for financial matters for the organization requesting the service offering 102. In another example, the request for approval may be directed to an administrator associated with a provider of the service offering 102. One of ordinary skill in the art will recognize various other types of approvals that may be requested by an approval module 412.

In one embodiment, the confirmation module 414 receives confirmation that the service offering 102 should be provisioned and deployed so long as approvals are granted. A requirements specification 106 may indicate that confirmation should be received before the service offering 102 is provisioned and deployed. In one embodiment, confirmation may be required from the user. In another embodiment, confirmation may be required from an administrator. In a further embodiment, confirmation may be required from a third party.

The scheduling module 416, in one embodiment, schedules provisioning and/or deployment of the configured service offering 102. The scheduling module 416 may operate in response to a requested schedule date provided by a user, in response to availability data relating to resources required for the service offering 102, or a combination of factors. The scheduling module 416 may also schedule other events related to the service offering 102, such as monitoring, re-provisioning, de-provisioning, and the like.

In one embodiment, the provisioning module 418 allocates resources for the service offering 102. The resources allocated by the provisioning module 418 may include any combination of access rights, hardware resources, and software resources. The resources required for the service offering 102 may be determined based on at least one logical association 124 between parameters for components of the service offering 102. The provisioning module 418 may also determine the cost of the service offering 102 in response to configuration options and logical associations 124 between parameters of service offering 102 components.

For example, a service offering 102 designed to provide a product launch website may provide options that impact the number of users allowed for the website. A provisioning module 418 may respond to an option selection that indicates that one thousand users are allowed by allocating resources capable of managing at least one thousand users. One of ordinary skill in the art will recognize various other types of provisioning that may performed by a provisioning module 418.

The deployment module 420, in one embodiment, deploys the service offering 102. The deployment module 420 may deploy the service offering 102 to a datacenter 310 in compliance with a service ordering process such that a service level agreement in an SLA template is satisfied. The deployment module 420 may access the datacenter by any method for deployment of the service offering 102, including file transfer protocol (FTP), hypertext transfer protocol (HTTP), using tools such as Tivoli™, or the like. In an alternate embodiment, the deployment module may deploy the service offering 102 by delivering an automated deployment package to the user. The automated deployment package may then be deployed by the user to a datacenter or server at a later time.

For example, the deployment module 420 may access a server at a datacenter 310 using FTP. The deployment module 420 may then transfer software resources to the server over the FTP connection, setting permissions and structure for files as needed. The deployment module 420 may further access a database using HTTP to define a database and structures in the database, along with passwords and access rights. One of ordinary skill in the art will recognize various other types of deployment that may performed by a deployment module 420.

In one embodiment, the monitoring module 422 monitors one or more aspects of the service offering 102. The monitoring module 422 may request data from a deployed service offering 102. In an alternate embodiment, the monitoring module 422 may receive data from a deployed service offering 102. Monitoring and the type of monitoring performed by the monitoring module 422 may be mandated by a requirements specification 106 associated with the service offering 102. Configuration options may also indicate monitoring requirements. Monitoring may be in response to one or more logical associations between parameters of components of the service offering 102.

For example, a monitoring module 422 may monitor QoS data for the service offering 102 by periodically querying the service offering 102 to determine performance characteristics of the service offering 102. The service offering 102 may report response times, load averages, or other performance data that may impact compliance with an SLA to the monitoring module 422. One of ordinary skill in the art will recognize various other types of monitoring that may performed by a monitoring module 422.

The re-provisioning module 424, in one embodiment, modifies the resources provided for the service offering 102. Re-provisioning by the re-provisioning module 424 may be triggered by a determination that an SLA requirement is not being met. One or more logical associations 124 may interact to indicate the resources required in the re-provisioning process to meet SLA requirements. Re-provisioning may result in changes to access rights, hardware resources, and software resources allocated to the service offering 102.

For example, a monitoring module 422 may report that the average response time of a website provided by a service offering 102 is exceeding the desired response time indicated in an SLA for the service offering 102. The re-provisioning module 424 may operate using one or more logical associations 124 to determine a change in resources for the service offering 102 including the provisioning of an additional server will improve the performance of the service offering 102 relative to the SLA requirement. As a result, the re-provisioning module 424 may provision an additional server for the service offering 102. One of ordinary skill in the art will recognize various other types of re-provisioning that may performed by a re-provisioning module 424.

The de-provisioning module 426, in one embodiment, may modify the resources available to the service offering 102 in response to a determination that more resources are allocated to the service offering 102 than are required. As a result, the de-provisioning module 426 may remove allocated resources from the service offering 102. One or more logical associations 124 may interact to indicate the resources required in the de-provisioning process. De-provisioning may result in removal of access rights, hardware resources, and software resources previously allocated to the service offering 102.

For example, a service offering 102 may have a termination date. When the termination date passes, resources allocated to the service offering 102 are no longer required. A de-provisioning module 426 may respond to the termination date by de-provisioning resources from the service offering 102. In another example, a monitoring module 422 may report that a service offering 102 is exceeding SLA requirements. The de-provisioning module 426 may respond by removing resources in compliance with one or more logical associations such that the service offering 102 continues to meet SLA requirements while freeing resources for other uses. One of ordinary skill in the art will recognize various other types of de-provisioning that may performed by a de-provisioning module 426.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
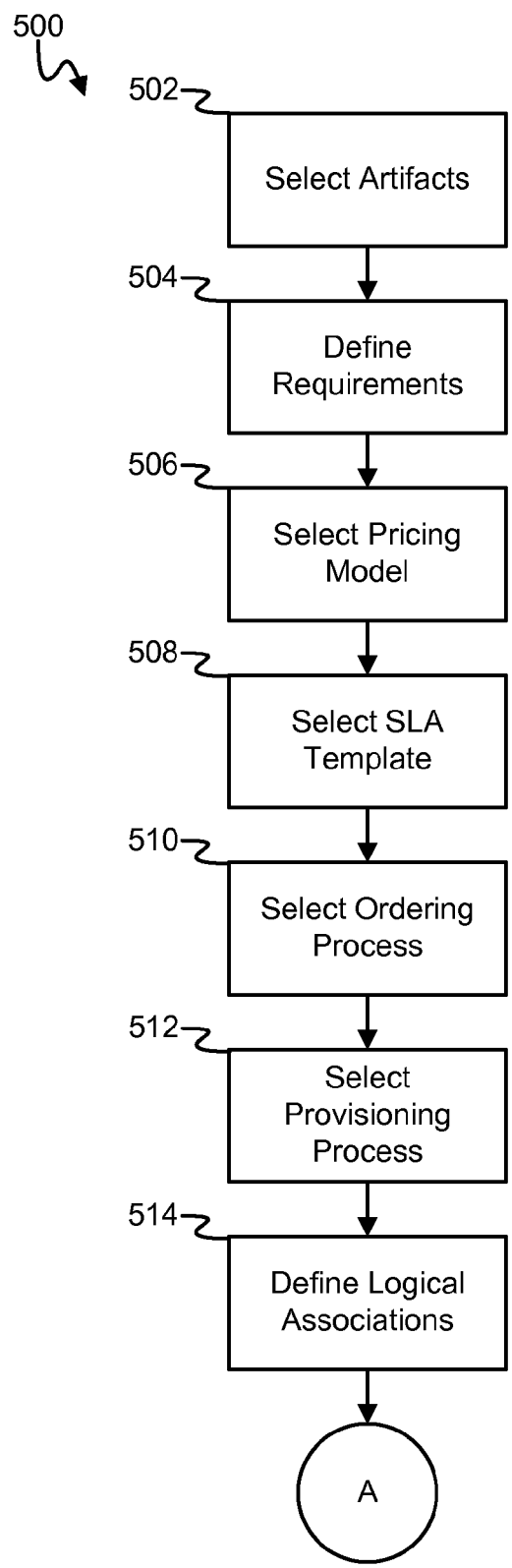
FIGS. 5 and 6 are a schematic flow chart diagram illustrating one embodiment of a method for logically packaging a service offering in accordance with the present invention.
Figure 6:
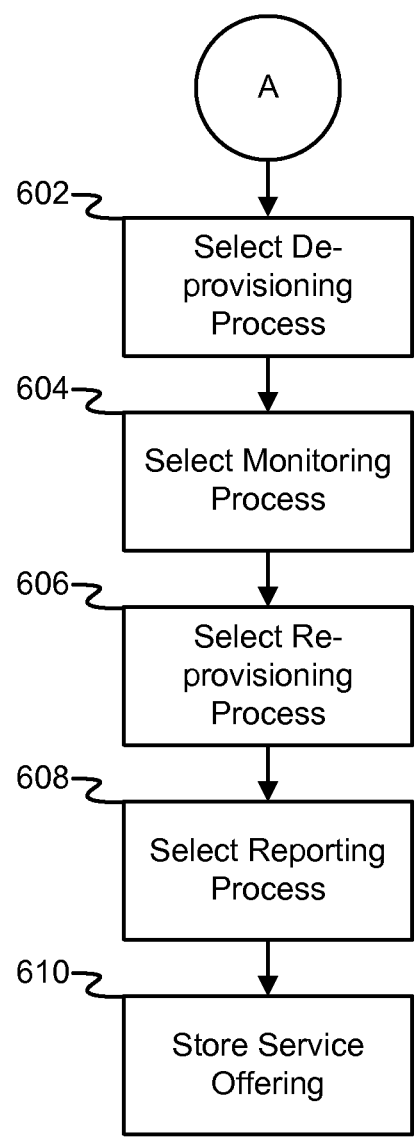

FIGS. 5 and 6 show a flow chart diagram illustrating the various steps of one embodiment of a method 500 for logically packaging a service offering 102. The method 500 is in certain embodiments a method of use of the system and apparatus of FIGS. 1-4, and will be discussed with reference to those figures. Nevertheless, the method 500 may also be conducted independently thereof and is not intended to be limited specifically to the embodiments discussed above with respect to those figures.

As shown in FIG. 5, the method 500 begins by selecting 502 a set of service implementation artifacts 104. The set of service implementation artifacts 104 may comprise one or more service implementation artifacts. Each service implementation artifact may be configured to perform a service function, and may comprise executable code and deployment information. Selecting 502 the set of service implementation artifacts 104 may comprise selecting one or more service implementation artifacts that may be used to perform the service functions required to implement a service offering 102.

Next, requirements for the service offering 102 are defined 504. The requirements may be defined 504 in a requirements specification 106. The requirements defined 504 may include required service functions of the service offering 102, options in the service offering 102, scaling parameters for the service offering 102, software requirements of the service offering 102, hardware requirements of the service offering 102, and the like.

A pricing model is selected 506 for the service offering 102. The pricing model may be defined for the service offering 102 and selected 506, or the pricing model may be selected 506 from a set of pricing models 114. The pricing model defines the price of the service offering 102, and may result in a price determined by parameters in the service offering 102, such as configuration options and component parameters.

An SLA template may be selected 508 for the service offering 102. The SLA template may be defined for the service offering 102 and selected 508, or the SLA template may be selected 508 from a set of SLA templates 112. The SLA template may indicate a set of service level parameters, and may further be associated with hardware requirements corresponding to the service level parameters.

A service ordering process may be selected 510 for the service offering 102. The service ordering process may be defined for the service offering 102 and selected 510 or the service ordering process may be selected 510 from a set of service ordering processes 108. The service ordering process defines a process for ordering the service offering 102. The service ordering process may include configurable parameters.

A service provisioning process may be selected 512 for the service offering 102. The service provisioning process may be defined for the service offering 102 and selected 510, or the service provisioning process may be selected 512 from a set of service provisioning processes 110. The service provisioning process defines a process for provisioning the service offering 102. The service provisioning process may include configurable parameters.

Logical associations 124 between parameters in the service offering 102 may be defined 514. The logical associations 124 may define a relationship between parameters of various components in the service offering 102. A logical association 124 may mandate a change in one or more parameters in response to a change in another parameter.

As shown in FIG. 6, a service de-provisioning process may be selected 602 for the service offering 102. The service de-provisioning process may be defined for the service offering 102 and selected 602, or the service de-provisioning process may be selected 602 from a set of service de-provisioning processes 116. The service de-provisioning process defines a process for de-provisioning the service offering 102. The service provisioning process may include configurable parameters.

A service monitoring process may be selected 604 for the service offering 102. The service monitoring process may be defined for the service offering 102 and selected 604, or the service monitoring process may be selected 604 from a set of service monitoring processes 118. The service monitoring process defines a process for monitoring the service offering 102. The service monitoring process may include configurable parameters.

A service re-provisioning process may be selected 606 for the service offering 102. The service re-provisioning process may be defined for the service offering 102 and selected 606, or the service re-provisioning process may be selected 606 from a set of service re-provisioning processes 120. The service re-provisioning process defines a process for re-provisioning the service offering 102. The service re-provisioning process may include configurable parameters.

A service reporting process may be selected 608 for the service offering 102. The service reporting process may be defined for the service offering 102 and selected 608, or the service reporting process may be selected 608 from a set of service reporting processes 122. The service reporting process defines a process for reporting performance characteristics of the service offering 102. The service reporting process may include configurable parameters.

Finally, the service offering 102 is stored 610. The service offering 102 may be stored 610 for access on a storage device local to a service delivery application 304, or the service offering 102 may be stored 610 for access on a remote storage device for access over a network. The storage device may comprise any digitally encoded storage medium, including a hard disk drive, a magnetic tape, solid state memory, or the like.

Figure 7:
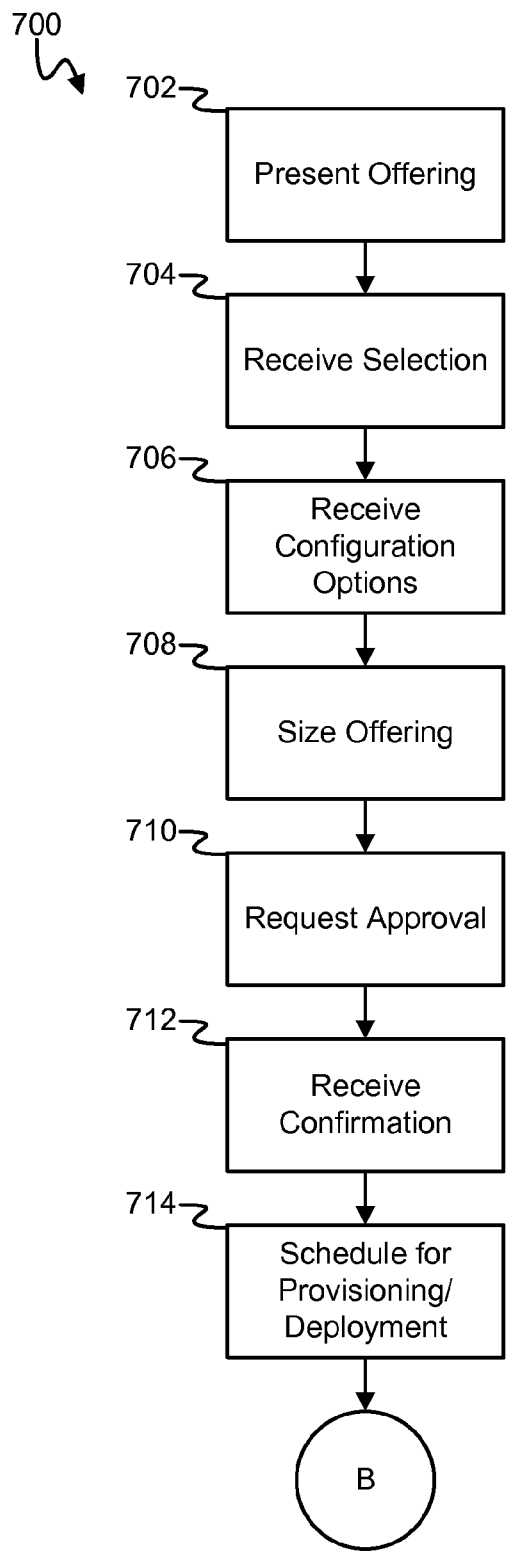
FIGS. 7 and 8 are a schematic flow chart diagram illustrating one embodiment of a method for delivering a logically packaged service offering in accordance with the present invention.
Figure 8:
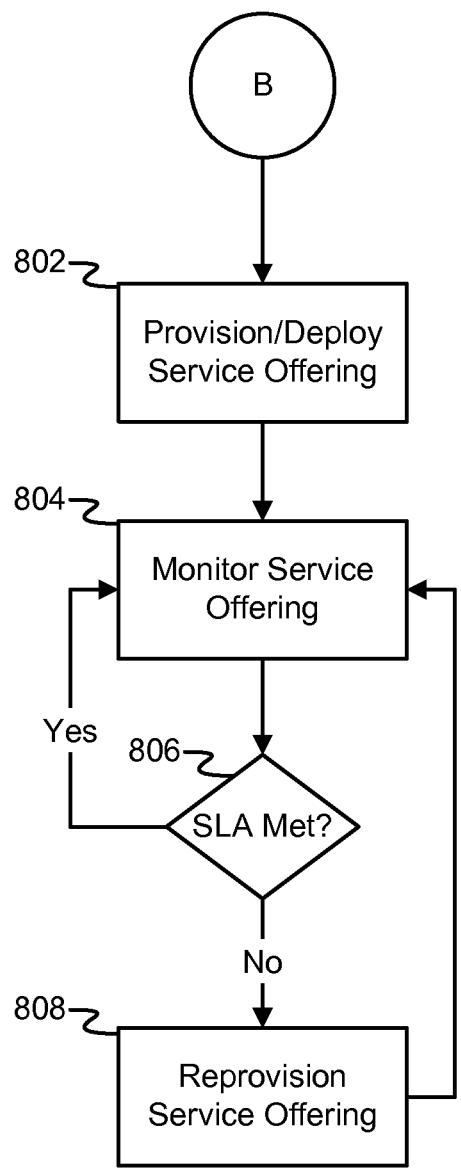

FIGS. 7 and 8 show a flow chart diagram illustrating the various steps of one embodiment of a method 700 for delivering a logically packaged service offering 102. The method 700 is in certain embodiments a method of use of the system and apparatus of FIGS. 1-4, and will be discussed with reference to those figures. Nevertheless, the method 700 may also be conducted independently thereof and is not intended to be limited specifically to the embodiments discussed above with respect to those figures.

As shown in FIG. 7, the method 700 begins by presenting 702 a service offering 102. In one embodiment, the method 700 presents a set of service offerings assembled in a catalog through a service catalog module 404. The method 700 may present the service offering 102 through a user interface 308, such as a web server configured for access by a web browser.

A selection of a service offering 102 is received 704 by the method. The selection may be made by a user and be received by a service delivery application 304. The selection may be received 704 for a service offering 102 chosen from among a plurality of service offerings 102 in a service catalog. The selection may be received 704 from a user ordering the service offering 102 through a user interface 308.

Next, one or more configuration options for the service offering 102 may be received 706. Each configuration option may impact one or more parameters of various components of the service offering 102, such as an SLA template 204, a service provisioning process 208, a pricing model 202, or other components described in relation to FIGS. 1-4. The parameters impacted by the configuration options may be linked to other parameters through logical associations 124 such that the receipt 706 of a configuration option may result in a change to a parameter, which change in turn results in a change to one or more other parameters. The configuration options may be received 706 from a user ordering the service offering 102 through a user interface 308.

The method 700 may include sizing 708 the service offering 102. Sizing 708 may include determining the components, resources, and costs required to implement the service offering 102 in response to received 706 configuration options. Sizing 708 may be implemented through the use of logical associations 124 between various parameters in the service offering 102. As a result of sizing 706, a price for the configured service offering 102 may be determined.

The method 700 may request 710 approval for an order for a service offering 102. In one embodiment, approval may be requested 710 from a user attempting to order the service offering 102. In another embodiment, approval may be requested 710 from an administrator of a service delivery application 304. In a further embodiment, approval may be requested 710 from a third party, such as a supervisor, a person authorized to bind a company to a financial commitment, or the like. The nature of the approval requested 710 may be impacted by the service offering 102 being ordered, configuration options received 706, a service ordering process 206, or the like.

Confirmation of an order may be received 712 as a step of the method 700. The confirmation received 712 may be related to the approval requested 710 by the method 700. A requirements specification 106 may indicate that confirmation should be received 712 before the service offering 102 is provisioned and deployed. In one embodiment, confirmation may be required from the user. In another embodiment, confirmation may be required from an administrator. In a further embodiment, confirmation may be required from a third party.

The service offering 102 may be scheduled 714 for provisioning and deployment. Scheduling 714 may be in response to one or more configuration options received 706 in the ordering process. Scheduling 714 may be impacted by one or more logical associations 124 between parameters in the service offering 102. For example, a logical association between a provisioning process indicating hardware resources required for the service offering 102 indicating a two day lead time for deployment and a parameter requiring a specific start date may cause provisioning and deployment to take place two days before the start date.

As shown in FIG. 8, the service offering 102 may be provisioned and deployed 802. Provisioning and deployment 802 may be scheduled 714 as described above. Additionally, provisioning and deployment 802 may be controlled by one or more logical associations 124 between parameters, and by one or more configuration options.

The service offering 102 may be monitored 804. Monitoring 804 may track and report various performance characteristics of the service offering 102 after provisioning and deployment 802. Performance characteristics relating to SLA requirements may be monitored 804. Monitoring 804 may include any standard service monitoring technique, such as QoS monitoring or the like.

The method 700 may include a determination 806 of compliance with an SLA requirement. Monitoring 804 may report that an SLA requirement is not being met. The method 700 may initiate a re-provisioning process in response to a determination 806 that an SLA requirement is not being met. A determination 806 that an SLA requirement is being met may result in continued monitoring 804 of the SLA requirement.

The service offering 102 may be re-provisioned 808. A re-provisioning module 424 may re-provision 808 the service offering 102 by modifying the resources allocated to the service offering 102. Re-provisioning 808 may be triggered by a determination 806 of a failure to meet an SLA requirement. One or more logical associations 124 may interact to indicate the resources required in the re-provisioning 808 process to meet SLA requirements.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a non-transitory computer readable medium having program instructions embodied therewith, the program instructions readable and executable by a processor to cause the processor to:
   define logical associations between configuration options of a service offering, configuration options of a service provisioning process, and configuration options of a pricing model, wherein the logical associations mandate a change to a configuration option for one of the service offering, the service provisioning process, and the pricing model in response to a change to another configuration option for one of the service offering, the service provisioning process, and the pricing model;
   define a service ordering process in accordance with the defined logical associations;
   size the service offering by iteratively modifying the configuration options of the service offering, the service provisioning process, and the pricing model based on the defined logical associations; and
   deploy the sized service offering.

2. The computer program product of claim 1 the processor further:
   selecting the service ordering process for ordering the service offering from a set of service ordering processes;
   upon receiving a selection of the service offering, initiating the selected service ordering process;
   selecting the pricing model from a set of pricing models for determining a cost of the service offering;
   selecting a service level agreement (SLA) template from a set of service level agreement templates that associate various service level parameters with corresponding hardware requirements; and
   storing the service offering comprising the requirements specification, the selected pricing model, the selected SLA template, the selected service ordering process, the service provisioning process, and the logical associations.

3. The computer program product of claim 1, wherein the logical associations are further defined between configuration options of a service level agreement template, a service deprovisioning process, a service monitoring process, a service reprovisioning process, and service implementation artifacts.

4. The computer program product of claim 1, the processor further:
   selecting the pricing model from a set of pricing models for determining a cost of the service offerings;
   selecting a service level agreement (SLA) template from a set of service level agreement templates that associate various service level parameters with corresponding hardware requirements; and
   storing the service offering comprising the requirements specification, the selected pricing model, the selected SLA template, the selected service ordering process, the service provisioning process, and the logical associations.

5. A system comprising:
   an application server configured to host an application stored in a non-transitory computer readable storage medium;
   a packaging and delivery application hosted by the application server, wherein the packaging and delivery application causes the server to:
      define logical associations between configuration options of a service offering, configuration options of a service provisioning process, and configuration options of a pricing model, wherein the logical associations mandate a change to a configuration option for one of the service offering, the service provisioning process, and the pricing model in response to a change to another configuration option for one of the service offering, the service provisioning process, and the pricing model;
      define a service ordering process in accordance with the defined logical associations;
      size the service offering by iteratively modifying the configuration options of the service offering, the service provisioning process, and the pricing model based on the defined logical associations; and
      deploy the sized service offering.

6. The system of claim 5, wherein the server further determines a cost for the service offering based on the pricing model associated with the service offering.

7. The system of claim 5, the server further:
   selecting the pricing model from a set of pricing models for determining a cost of the service offerings;
   selecting a service level agreement (SLA) template from a set of service level agreement templates that associate various service level parameters with corresponding hardware requirements; and
   storing the service offering comprising the requirements specification, the selected pricing model, the selected SLA template, the selected service ordering process, the service provisioning process, and the logical associations.

8. The system of claim 5, the server further:
selecting the service ordering process for ordering the service offering from a set of service ordering processes;
upon receiving a selection of the service offering, initiating the selected service ordering process;
selecting the pricing model from a set of pricing models for determining a cost of the service offering;
selecting a service level agreement (SLA) template from a set of service level agreement templates configured to associate various service level parameters with corresponding hardware requirements; and
storing the service offering comprising the requirements specification, the selected pricing model, the selected SLA template, the selected service ordering process, the service provisioning process, and the logical associations.

9. The system of claim 5, wherein the logical associations are further defined between configuration options of a service level agreement template, a service deprovisioning process, a service monitoring process, a service reprovisioning process, and service implementation artifacts.

10. A method for deploying computing infrastructure comprising integrating computer-readable code into a non-transitory computer readable storage medium of a computing system, wherein the code in combination with the computing system performs the following:
defining logical associations between configuration options of a service offering, configuration options of a service provisioning process, and configuration options of a pricing model, wherein the logical associations mandate a change to a configuration option for one of the service offering, the service provisioning process, and the pricing model in response to a change to another configuration option for one of the service offering, the service provisioning process, and the pricing model;
defining a service ordering process in accordance with the defined logical associations;
sizing the service offering by iteratively modifying the configuration options of the service offering, the service provisioning process, and the pricing model based on the defined logical associations; and
deploying the sized service offering.

11. The method of claim 10, the method further comprising:
selecting the pricing model from a set of pricing models for determining a cost of the service offerings;
selecting a service level agreement (SLA) template from a set of service level agreement templates that associate various service level parameters with corresponding hardware requirements; and
storing the service offering comprising the requirements specification, the selected pricing model, the selected SLA template, the selected service ordering process, the service provisioning process, and the logical associations.

12. The method of claim 10, the computer system further performing:
selecting the service ordering process for ordering the service offering from a set of service ordering processes;
upon receiving a selection of the service offering, initiating the selected service ordering process;
selecting the pricing model from a set of pricing models for determining a cost of the service offering;
selecting a service level agreement (SLA) template from a set of service level agreement templates that associate various service level parameters with corresponding hardware requirements; and
storing the service offering comprising the requirements specification, the selected pricing model, the selected SLA template, the selected service ordering process, the service provisioning process, and the logical associations.

13. The method of claim 10, wherein the logical associations are further defined between configuration options of a service level agreement template, a service deprovisioning process, a service monitoring process, a service reprovisioning process, and service implementation artifacts.

* * * * *